Aug. 18, 1931. G. GOURDON 1,819,551
METHOD AND APPARATUS FOR CAPTURING INSECTS
Filed Dec. 27, 1929 3 Sheets-Sheet 3
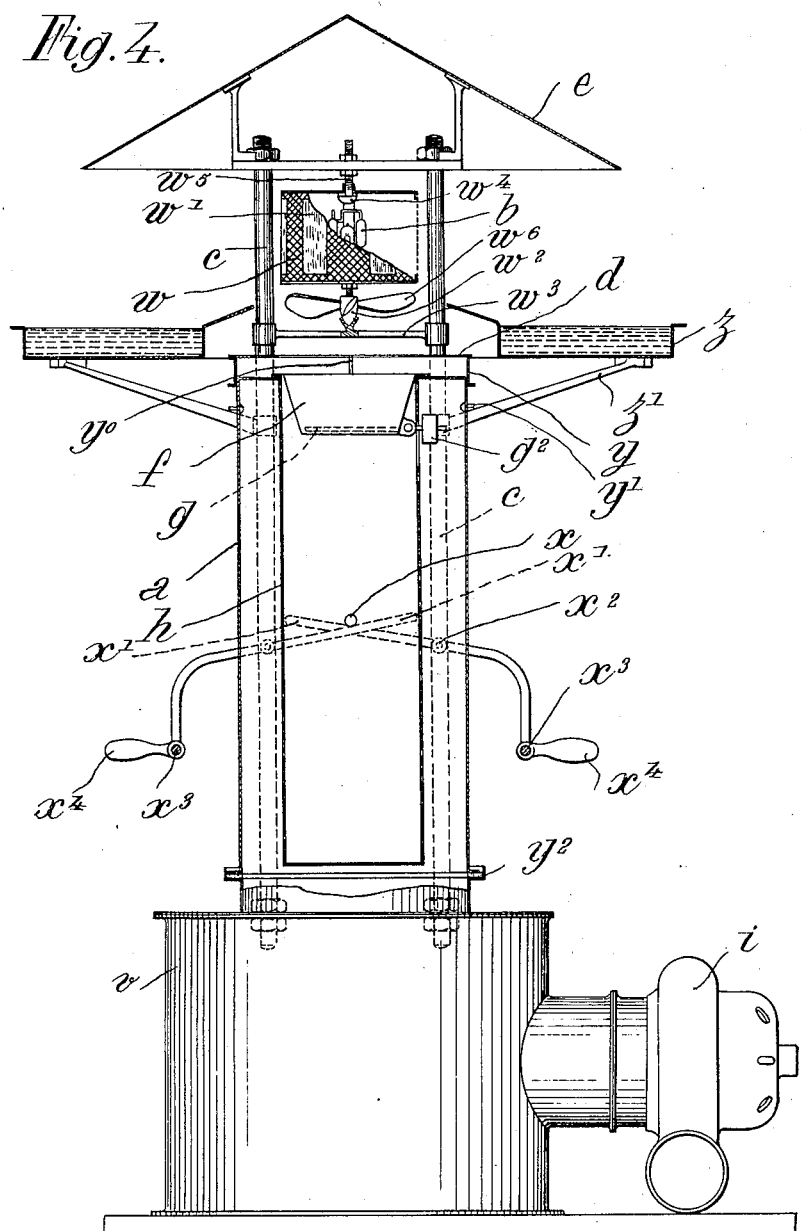
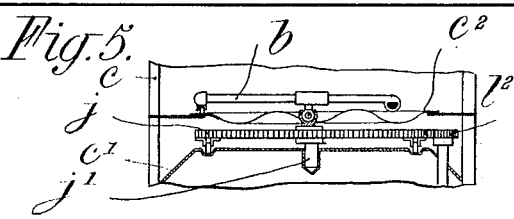
Georges Gourdon
Inventor
by Louis Barnett
Attorney Patented Aug. 18, 1931

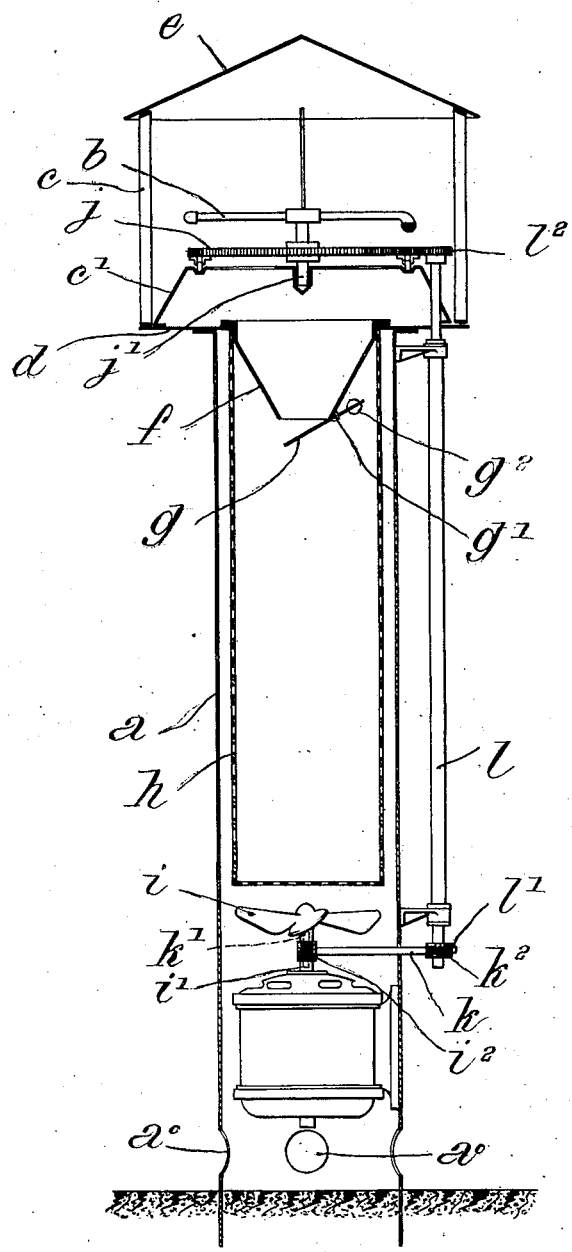

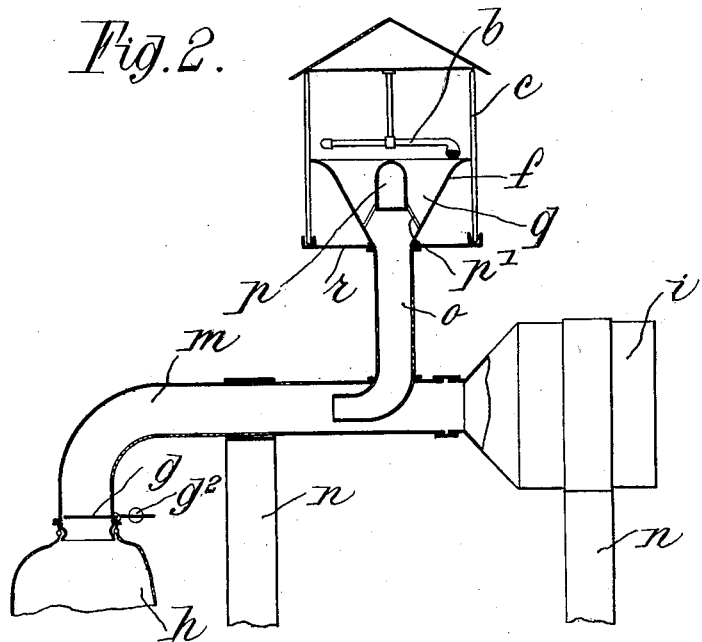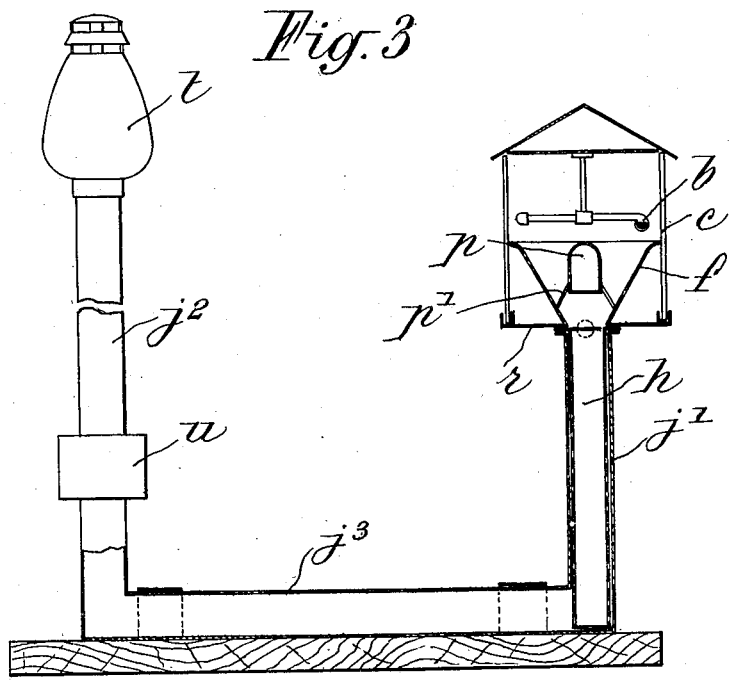

1,819,551

UNITED STATES PATENT OFFICE

GEORGES GOURDON, OF MONTMORENCY, FRANCE

METHOD AND APPARATUS FOR CAPTURING INSECTS

Application filed December 27, 1929, Serial No. 416,779, and in Belgium January 9, 1929.

The present invention relates to methods and apparatus for capturing insects.

One of the objects of the invention is to provide a method and apparatus based on the use of ultra-violet light for increasing the efficiency of insect traps.

Another object is to provide an apparatus for producing intermittent beams of ultra-violet light.

A further object is to combine an intermittent source of light with a scintillating or fluorescent source to attract insects.

Still another object is to provide improved ventilating means operative to sweep insects attracted by an intermittent source of ultra-violet light into the trap.

Additional objects will appear in the course of the detailed description now to be given with reference to the accompanying drawings, in which:—

Fig. 1 represents, diagrammatically, a section of one illustrative embodiment of the invention;

Fig. 2 shows, in diagrammatic section, a second form of the invention;

Fig. 3 illustrates, in plan, partially in section, a third possible form;

Fig. 4 is a section through a fourth and final constructive form that the invention may take;

Fig. 5 shows a special lamp mounting.

Referring to Fig. 1 of the drawings, there is shown a vertical shell $a$ provided with air outlets $a^0$,—a rotatable, rectilinear quartz, mercury arc lamp $b$ of usual construction having terminals supplied with current from brushes (not shown),—a plurality of uprights $c$,—a support $c^1$ provided with circumferentially extending lateral surfaces covered with zinc sulphide or similar fluorescent substance, the latter being protected by a layer of quartz,—a flange $d$ supporting elements $c$ and $c^1$,—a roof $e$,—a hopper $f$ provided with a trap door $g$ pivotally mounted at $g^1$ and counter-balanced by a weight $g^2$ tending to move door $g$ towards its closed position,—a foraminous shell $h$ adapted to permit circulation of air,—a fan $i$ keyed to motor shaft $i^1$,—a worm and wheel $i^2$ driven by shaft $i^1$ and driving a shaft $k$,—a worm $k^2$ mounted on shaft $k$ and driving a wheel $l^1$ keyed to one end of a vertical shaft $l$,—and a pinion $l^2$ keyed to shaft $l$ and meshing with pinion $j$ connected in driving relation to lamp $b$.

The above described apparatus functions as follows:—

At night fall, lamp $b$ and the motor are set in operation, the rotation of the latter creating a downward draft (fan $i$) causing door $g$ to open so as to permit air to pass into funnel $f$, through perforated shell $h$ and out through ports $a^0$. At the same time, shafts $k$ and $l$ and pinion $j$ begin to rotate and transmit their motion to lamp $b$. Supports $c$ are made of sufficient width to serve as light screens and, since lamp $b$ is rectilinear, function to cut off the greater part of the light therefrom when the latter is in line therewith. The fluorescent portions of element $c^1$ receiving light from lamp $b$ emit light which is found to powerfully attract certain insect species. The light emitted from the lamp $b$ and from the fluorescent portions of the element $c^1$ is thus of varying intensity and appears to have the effect of deceiving the insects as to their distance from the light and they approach into the zone of draft exerted by fan $i$ only to be swept into funnel $f$ past door $g$ and then into "basket" $h$. As soon as the motor is stopped, counterweight $g^2$ moves door $g$ into closed position and the insects are unable to escape. Elements $f$, $g$ and $h$ should form a single unit capable of being removed from shell $a$ via a door formed in the latter (not shown) or by mounting shell $a$ on hinges placed near the bottom portion thereof (not shown) or in any other convenient manner that may occur to those skilled in the art.

The form of device shown in Fig. 2 differs from the one already described only in the means for obtaining a draft. Here, a fan $i$ directs a blast of air into a tube $m$ fitted with a trap-door assembly $g$, $g^2$ like the one shown in Fig. 1, tube is terminating in a metal or cloth "basket" or sack $h$ adapted to "filter" the insects out of the air current passing therethrough. The insects are attracted, as before, by lamp $b$ (rotated by a separate motor or by suitable shafting not shown) and are sucked into a funnel $f$ having an annular entrance $q$ limited internally by a cylinder $p$ supported by stays $p^1$, then into conduit $o$ having a restricted portion extending into conduit $m$. Supports $c$ for the roof are mounted on an annular element $r$ and the whole apparatus rests on uprights $n, n$. The general operation is obvious.

The structure represented in Fig. 3 is designed to eliminate a ventilating fan. The inlet assembly is substantially the same as shown in Fig. 2 lamp $b$ being either rotated by a small separate motor or maintained stationary and intermittently illuminated and extinguished by any form of current make and break device (not shown) and is connected to a tube $j^1$ carrying a perforated basket $h$. A downward draft is created in conduit $j^1$ by a chimney $j^2$ communicating with the latter via a flue $j^3$, chimney $j^2$ being five or more times as high as $j^1$ and carrying a static aspirator $t$ at its upper extremity of any current design. To increase the draft, the transformer supplying current to lamp $b$ may be housed in chimney $j^2$ so that its heating effect may increase the upward velocity of the air inside the latter.

The variant illustrated in Fig. 4 is designed to do away with the shafting illustrated in Fig. 1 and includes, in addition, another possible type of assembly for providing an intermittent beam of light. The assembly includes, a shell $a$, detachably supported on base $v$ at $y^2$,—a fixed mercury arc lamp $b$ provided with proper leads,—two pairs of uprights $c$ straddling shell $a$,—a plate $d$ having a central orifice therein,—a roof $e$,—an assembly $f, g, g^1, g^2, h, i$ similar to the one in Fig. 1,—means for intermittently cutting off the light from lamp $b$ consisting of a wire basket $w$ provided with vertical plates $w^1$ adapted to cut off the light and rotatably supported between point $w^5$ and bar $w^3$, and a fan $w^6$,—means for tipping shell $a$ and the elements contained therein about a rod $x$ as an axis comprising a split collar $y$ sealing the space between elements $a$ and $d$, said collar being provided with flanges $y^0$ traversed by a bolt (not shown), and a pair of levers $x^1, x^1$ pivotally supported at points $x^2, x^2$ and articulating with handles $x^4, x^4$ at points $x^3, x^3$,—and means for producing scintillations composed of an annular basin $z$ supported by studs $z^1$.

This assembly operates substantially in the same way as the one represented in Fig. 1. As soon as motor is started, trap $g$ opens and the incoming current of air flowing over blades $w^6$ rotate basket $w$ and plates $w^1$ attached thereto. The light coming from lamp $b$ is intermittently cut off by plates $w^1$ and is deflected in part from the water contained in basin $z$ which water, under the influence of the wind and the vibration of supports $c$, is sufficiently agitated to produce a scintillating effect. When it is desired to empty basket $h$, collar $y$ is loosened by removing the bolt traversing flanges $y^0$ and falls onto pins $y^1$; levers $x^1, x^1$ are then manipulated to bear against rod $x$ so as to raise shell $a$ far enough from its support to permit a tilting movement.

Fig. 5 shows a lamp mounting adapted to be used in structures of the type illustrated in Figs. 1 to 3. Lamp $b$, which is of the type in which a tilting movement causes the mercury therein to make and break the lighting circuit, is pivotally connected at one end to rotatable support $j$ and rides, at its other end over cam $c^2$ mounted on supports $c$. Rotation of support $j$ will cause the free end of the lamp to move up and down and so alternately make and break the lighting circuit.

The invention is not to be taken as limited to the particular combinations shown in any one of the figures; thus the means shown in Fig. 4 for varying the intensity of light emitted by the lamp may be used interchangeably with those represented in Figs. 1, 2 or 5; the ventilators shown in Figs. 2 and 3 may replace those of the type illustrated in Figs. 1 and 4 with such changes as will be obvious to those skilled in the art; the fluorescent and scintillating devices represented in Figs. 1 and 4, respectively, may replace or supplement one another and may be mounted singly or in combination on the structures in Figs. 2 and 3; the means for tipping shell $a$ and basket $h$ in Fig. 4 may be adapted to the devices shown in Figs. 1 and 3, etc.

What I claim is:—

1. In a method of the kind described, the steps of attracting insects with a light source of varying intensity, and entrapping said insects.

2. In a method of the kind described, the steps of attracting insects with a scintillating light beam rich in ultraviolet rays, and entrapping said insects.

3. In a method of the kind described, the steps of attracting insects with intermittent beams of scintillating light rich in ultraviolet rays, and entrapping said insects.

4. In a method of the kind described, the steps of attracting insects with an intermittent beam of light, and entrapping said insects.

5. In a trap, a source of light rich in ultraviolet rays, means operative to vary the intensity of the light falling on a predetermined point in radiating range of said light source, an enclosure having openings in the walls thereof of a size permitting the passage of air therethrough, a trap door pivotally mounted at the air inlet of said inclosure and opening in the direction of the air current flowing thereinto, a counterweight tending to move said trap door into closed position, and means for producing an air current flowing from the source of light towards said enclosure.

6. In a trap, a source of light, means operative to vary the intensity of the light falling on a predetermined point in radiating range of said light source, scintillating and reflecting means positioned within radiating range of said light source and operative to reflect scintillating beams of light, an enclosure provided with an air-inlet, and means for producing a current of air flowing from said light source towards the air inlet of said enclosure.

In testimony whereof I affix my signature.

GEORGES GOURDON.